(12) United States Patent  
Rasanen et al.

(10) Patent No.: US 9,028,767 B2  
(45) Date of Patent: May 12, 2015

(54) METHOD AND A REACTOR FOR MIXING ONE OR MORE CHEMICALS INTO A PROCESS LIQUID FLOW

(75) Inventors: Jari Rasanen, Imatra (FI); Jouni Matula, Savonlinna (FI)

(73) Assignee: Wetend Technologies Oy, Savonlinna (FI)

( * ) Notice: Subject to any disclaimer, the term of this patent is extended or adjusted under 35 U.S.C. 154(b) by 138 days.

(21) Appl. No.: 13/583,909

(22) PCT Filed: Mar. 9, 2011

(86) PCT No.: PCT/FI2011/050205  
§ 371 (c)(1),  
(2), (4) Date: Sep. 10, 2012

(87) PCT Pub. No.: WO2011/110745  
PCT Pub. Date: Sep. 15, 2011

(65) Prior Publication Data  
US 2013/0000858 A1    Jan. 3, 2013

(30) Foreign Application Priority Data

Mar. 10, 2010   (FI) ..................................... 20205231

(51) Int. Cl.  
*B01J 19/00*    (2006.01)  
*B01J 19/08*    (2006.01)  
(Continued)

(52) U.S. Cl.  
CPC ............. *D21H 23/04* (2013.01); *D21H 17/675* (2013.01); *D21H 17/70* (2013.01)

(58) Field of Classification Search  
CPC ......... A01N 59/00; A01N 37/16; B01J 19/00; B01J 8/00; B01J 2219/00006; B01J 4/002; B01J 19/0066; B01J 19/26; B01J 19/0053; B01J 19/08; B01J 19/10; B82Y 40/00; D21H 27/002; D21H 11/12; D21H 27/005; D21H 27/30; D21H 17/63; D21H 17/67; D21H 17/675; D21H 17/70; D21H 23/00; D21H 23/02; D21H 23/04; D21C 5/00; B01F 13/00; B01F 13/0001; B01F 13/0003; B01F 13/0005; B01F 13/0006; B01F 13/0008; B01F 2215/00; B01F 2215/0001; B01F 2215/0078  
USPC .......... 422/129, 187, 224; 162/100, 192, 232, 162/262  
See application file for complete search history.

(56) References Cited

U.S. PATENT DOCUMENTS 2,884,375 A  *  4/1959  Seelig et al. .................. 208/146  
5,074,998 A     12/1991  Doelman  
(Continued)

OTHER PUBLICATIONS

Mozaffari-PhD, P.Eng., "Abitibi Consolidated Solves Mill Calcium Scale Problem With Electroic Scale Elimination", vol. I, Issue I, Sep. 2004, 2 pages.

(Continued)

*Primary Examiner* — Natasha Young  
(74) *Attorney, Agent, or Firm* — Nixon & Vanderhye P.C.

(57) ABSTRACT

A method for mixing a chemical into a process liquid including: injecting the chemical into the process liquid flowing through a flow pipe; forming reaction products by a reaction involving the chemical occurring in the process flow; applying an electric field or magnetic field to a region of the flow pipe adjacent to the reaction occurring in the process flow, and suppressing the precipitation of the chemical or the reaction products on the surfaces of the pipe due to the electric or magnetic field.

11 Claims, 4 Drawing Sheets

(51) Int. Cl.
*B01F 13/00* (2006.01)
*D21H 17/63* (2006.01)
*D21H 17/67* (2006.01)
*D21H 17/70* (2006.01)
*D21H 23/00* (2006.01)
*D21H 23/02* (2006.01)
*D21H 23/04* (2006.01)

(56) References Cited

U.S. PATENT DOCUMENTS

| | | | | |
|---|---|---|---|---|
| 5,466,063 | A | * | 11/1995 | Poyet et al. ........................ 366/6 |
| 5,670,041 | A | * | 9/1997 | Cho et al. ....................... 210/222 |
| 5,872,089 | A | * | 2/1999 | Lo ................................. 510/247 |
| 6,659,636 | B1 | * | 12/2003 | Matula ........................ 366/165.1 |
| 2009/0038944 | A1 | * | 2/2009 | Kruger ........................... 204/555 |

OTHER PUBLICATIONS

Akd, Alkylketene Dimer, "Mini-Encyclopedia of Papermaking Wet-End Chemistry", http://www4.ncsu.edu, Nov. 23, 2009, 2 pages.
Alum (aluminum sulfate), "Mini-Encyclopedia of Papermaking Wet-End Chemistry", http://www4.ncsu.edu, Nov. 23, 2009, 2 pages.
Alkenylsuccinic Anhydride (ASA), ASA Size, "Mini-Encyclopedia of Papermaking Wet-End Chemistry", http://www4.ncsu.edu, Nov. 23, 2009, 2 pages.
Nadia Abdel-Aal, et al., "Study of Adhesion Mechanism of Calcareous Scaling by Using Quartz Crystal Microbalance Technique", Analytical Sciences 2001, vol. 17 Supplement, The Japan Society for Analytical Chemistry, i825-i828.
"Deposits (Inorganic, Organic, Pitch, Stickies)", 6 pages, (pre Mar. 10, 2010).
A.V. Delgado et al., "Measurement and Interpretation of Electrokinetic Phenomena," Pure Appl. Chem., vol. 77, No. 10, pp. 1753-1805, 2005.
"Engineeringtalk", Electronic Scale Control Success at Paper Mill, Nov. 20, 2009, http://www.engineeringtalk.com, 1 page.
"Frequently Asked Questions", Scalewatcher, http://www.scalewatcher.co.uk, Dec. 29, 2009, 2 pages.
M. Michael Pitts Jr., PhD, "Fouling Mitigation in Aqueous Systems Using Electrochemical Water Treatment," Zeta Corporation, http://www.zetacorp.com, 4 pages, Jan. 27, 2010.
"How Does It Work?", Scalewatcher, http://www.scalewatcher.co.uk, Dec. 29, 2009, 2 pages.
How the Zeta Rod Works, "Zeta RodTM Science & Technology", 4 pages, (pre Mar. 10, 2010).
"Clean and Green Energy Savings, Scale Removal, Prevention & Control for Water Systems", MHD Systems, 2 pages, (pre Mar. 10, 2010).
"Magnetic Water Treatment", Wikipedia, the free Encyclopedia, Dec. 10, 2010, 3 pages.
Peter Hart et al, "Mineral Scale Management, Part 1. Case Studies", Peer-Reviewed Scale, TAPPI Journal, Jun. 2006, 6 pages.
Alan Rudie et al, "Mineral Scale Management, Part II. Fundamental Chemistry", Peer-Reviewed Scale, TAPPI Journal, vol. 5: No. 7, Jul. 2006, 7 pages.
Alan Rudie et al, "Mineral Scale Management, Part III. Nonprocess Elements in the Paper Industry", Peer-Reviewed Scale, TAPPI Journal, vol. 5: No. 8, Aug. 2006, 7 pages.
Peter Hart, et al., "Application of Fundamental Principles to Mineral Scale Reduction—Case Studies", 18 pages, (pre Mar. 10, 2010).
Loraine Huchler, "Non-Chemical Water Treatment Systems: Histories, Principles and Literature Review", Presented at the International Water Conference, Oct. 22, 2002, 11 pages.
PAAE, Wet-Strength Resin, Polyamidoamine-Epichlorohydrin (PAAE), "Mini-Encyclopedia of Papermaking Wet-End Chemistry", http://www4.ncsu.edu, Nov. 23, 2009, 2 pages.
PAC, Polyaluminum Chloride (PAC), "Mini-Encyclopedia of Papermaking Wet-End Chemistry", http://www4.ncsu.edu, Nov. 23, 2009, 2 pages.
Precipitated Calcium Carbonate (PCC), "Mini-Encyclopedia of Papermaking Wet-End Chemistry", http://www4.ncsu.edu, Nov. 23, 2009, 2 pages.
"Product Details and Guarantees", Scalewatcher, http://www.scalewatcher.co.uk, Dec. 29, 2009, 2 pages.
"Why Scalewatcher?", Reasons to buy Scalewatcher, Scalewatcher, http://www.scalewatcher.co.uk, Dec. 29, 2009, 2 pages.
Terrence Gallagher, "Retention: The Key to Efficient Papermaking", http://wwwcsi,unian.it, 11 pages, Nov. 20, 2009.
Rosin Emulsion Sizing Agents, Rosin Emulsion Size, "Mini-Encyclopedia of Papermaking Wet-End Chemistry", http://www4.ncsu.edu, Nov. 23, 2009, 2 pages.
GWS, Griswold Water Systems, "A Reliable Alternative to Chemicals for Cooling Water Treatment", Aug. 28, 2007, 9 pages.
"Installation Instructions", Scalewatcher, http://www.scalewatcher.co.uk, Dec. 29, 2009, 2 pages.
"Technical Information", Scalewatcher, http://www.scalewatcher.co.uk, Dec. 29, 2009, 2 pages.
"Scalewatcher-Electronic Scale Control", Scalewatcher, http://www.scalewatcher.co.uk, Dec. 29, 2009, 2 pages.
"Slime Problems", Slime Problems (Troubleshooting Guide), http://www4.ncsu.edu, 2 pages, Nov. 19, 2009.
Starch, "Mini-Encyclopedia of Papermaking Wet-End Chemistry", http://www4.ncsu.edu, Nov. 23, 2009, 2 pages.
Stickies (papermaking), Wikipedia, the free encyclopedia, 2 pages, Nov. 20, 2009.
"The Zeta Rod System", 1 page, http://www.esotech.ws, Jan. 15, 2010.
"Bifouling & Biocorrosion", Zeta Corporation, http://www.zetacorp.com, 3 pages, Jan. 27, 2010.
DSI Canada Ltd., "Xstrata", (pre Mar. 10, 2010), 2 pages.
"The Zeta Rod Design and Performance", 3 pages, (pre Mar. 10, 2010).
Zeta Rod Installation, 3 pages, (pre Mar. 10, 2010).
W.L. Cho et al., "The Use of Scalewatcher Electronic Water Treatment in the Reduction of Scale in Pulp and Paper Applications", 83rd Annual Meeting, Technical Section CPPA B453-B456, (pre Mar. 10, 2010).
"Magnetic Water Treatment", From Wikipedia, the free Encyclopedia, Jan. 3, 2011, 3 pages.

* cited by examiner

METHOD AND A REACTOR FOR MIXING ONE OR MORE CHEMICALS INTO A PROCESS LIQUID FLOW

RELATED APPLICATIONS

This application is the U.S. national phase of International Application No. PCT/FI2011/050205, now WO 2011/110745, filed 9 Mar. 2011 which designated the U.S. and claims priority to FI 20105231 filed 10 Mar. 2010, the entire contents of each of which are hereby incorporated by reference.

BACKGROUND OF INVENTION

The present invention relates to a method and a reactor for mixing one or more chemicals into a process liquid flow. Preferably the method and reactor according to the invention are suitable for introducing and mixing into a process liquid flow one or more chemicals that either alone or together with the material entrained in the one or more process flow tend to form either organic or inorganic layers, accumulations or precipitations onto the wall of the flow tube. The invention is especially preferably suitable for use in e.g. wood processing industry when one or more chemicals of paper and pulp production are being introduced into the production process.

In for example papermaking, as in numerous other fields of industry, there are needs to introduce and in-line mix at least one such substance, hereinafter called a chemical in the widest meaning of the word, into a pipe flow either on its own or that can chemically, electro-chemically or mechanically among themselves or with the materials in the pipe flow form accumulations of solids, precipitations or the like to the wall of the flow pipe or channel. Thus it is to be understood that in the context of this invention the word chemical covers gaseous, substances, liquid substances as well as solid materials. In other words said chemical can, for example, be a substance chemically reacting with a chemical introduced previously or simultaneously into the process flow or one present there initially, or e.g. a retention or adhesive material that is attached to other solid material or particle present in the flow or being introduced into it with the chemical or near it. Thus the idea is also that the word "reaction" covers chemical reactions, electrochemical reactions as well as attachment of particles to each other by means of retention materials and adhesive materials. In other words, all such situations in which the material entrained with the process flow and/or introduced thereto forms material tending to fasten to the surface of the process pipe or structures located therein, is for the sake of clarity called a reaction. In this application the word in-line mixing means mixing made directly in the process pipe taking place, e.g. in papermaking when a chemical is added directly into the pulp flowing in a process pipe towards the headbox of a paper machine. In-line mixing also covers the applications in which the mixing takes place into a liquid or suspension flow of the main or partial process without the product produced in said partial process being stored in immediate storage either alone or together with another product.

In some cases discussed on prior art it is enough to let the desired amount of chemical to flow into a tube flow so that it is mixed with the flowing material, a liquid or a gas, by the turbulence in the actual tube flow. Sometimes the desired amount of the chemical is drained into such a point of a pipe flow where there is a turbulence-producing mechanical apparatus slightly after the chemical addition point, either a static flow hindrance, a rotary mixer or, for example, a centrifugal pump. In some cases the chemical is introduced into a relatively large tank arranged in the process, either directly or, for example, with a substance directed into the tank, whereby the necessary mixer is arranged in the tank.

In all these contexts it is possible that either organic or inorganic precipitations affecting the process accumulate on the wall of either the flow pipe or a special reactor or on some other fixed structure, such as e.g. the chemical introduction means or various structures of the mixer. Such disadvantages can be seen in e.g. that the organic matter starts to decay and spreads microbes into the flow, causing spoilage of the whole end product in the worst case, or in that when released as larger particles the layer spoils the end product by causing e.g. holes in the produced paper (when using paper industry as an example) or disadvantageous changes in the flows of the headbox, causing deterioration of the quality of the end product. The precipitations can also block some process apparatuses or their pipelines fully or partly, increase pumping costs, reduce the effect of chemicals, decrease heat recovery and so on. Further, a layer of a certain kind can form a base for another precipitation, such as a calcium carbonate layer greatly enhances the precipitation of sodium carbonate in black liquor evaporators.

As said problem relating to various precipitations has been known for as long as there have been industrial processes, there have also been attempts to solve it in a number of ways.

One method is naturally to avoid use of materials forming precipitations and to replace them with non-precipitating materials, which however can only ease a marginal amount of the problem cases. In some cases it is not possible to avoid use of precipitating materials and in some cases the replacement materials are so expensive that their use is economically impossible.

Another alternative is to use high-quality raw materials starting from the debarking mill of the pulp mill. In other words, the precipitation problem can be reduced by minimizing the access of the bark layer of the wood into further process. It is also possible to reduce the return of chemicals causing precipitations to use by considering the chemicals causing precipitation problems in chemical circulation. In other words, by considering the precipitation problems in each partial process of the mill, which when using cellulose, pulp and paper industry as example include digester processes, washing and bleaching of brown pulp in addition to chemical recovery, it is possible to considerably reduce the risk of precipitations.

The third alternative is to arrange such flow conditions that precipitations are not allowed to accumulate in e.g. the flow pipe system. In other words, the aim is to plan the flow pipe system so that there are as few places as possible where the flow is so quiet that the solids entrained with the flow can settle against the surface of the pipe system. This method, also, is only limited, because in practice it is impossible to plan the flow pipe system so that no precipitations can be formed. However, good planning allows lengthening washing intervals and the plant downtime required by them.

The fourth alternative is to consider the cleaning requirements of the pipe system already in the planning stage, which allows shortening the required downtime needed for e.g. acid cleaning or the like of the process apparatuses or even manual removal of the layers/precipitations.

The fifth way is to manufacture or coat e.g. the flow pipe system or the reactor with such material that the materials with precipitation tendencies do not attach to it for some reason. The disadvantage of this is, however, that replacing the traditional steel flow pipe or reactor with nearly any other material will multiply the costs.

The sixth alternative is to use such additional chemicals, such as some retention chemicals, chelates, surfactants or inhibitors that one way or the other prevent the formation of precipitations. Such chemicals, however, naturally cause at least additional costs, as they must be continuously measured into the process liquid. Such chemicals can also cause problems in the processing of the process effluents, reusability of the water or in the actual end product, its processing or recycling.

None of the above-mentioned methods has not, however, been found to be totally functional in paper industry, but instead the both flow pipes and process apparatuses as well as reactors and tanks are soiled as precipitations accumulate on their walls.

The above-mentioned precipitation problems have been emphasized when the injection mixers described in, among others, patent publications EP-B1-1064427, EP-B1-1219344, FI-B-111868, FI-B-115148 and FI-B-116473 have been commissioned more widely. The reason for the increase of problems is that while these injection mixers are capable of mixing the chemicals very quickly and evenly into the process flow, the mutual reaction of the chemicals or the reaction with the solids or chemicals in the flow is very fast. Thus there also is a large amount of chemicals simultaneously in the vicinity of the wall of the flow pipe so that as the chemicals form a solids crystal or particle it is attached to the wall of the flow pipe instead of another solid material, such as a fiber or a filler particle. Corresponding chemicals were previously introduced by means of weaker mixers, whereby it took the chemicals tens of seconds, sometimes even minutes, to react mutually or with the solid material or chemical of the flow previously introduced thereto, whereby also the precipitations happening onto the inner surface of the flow pipe were distributed on an essentially longer length of the flow pipe. While the precipitations were previously distributed along nearly the whole length of the process pipes subsequent to the introduction point, they now cover in many cases the surface of the flow pipe for a distance of a few meters from the introduction of chemicals. Because it can be supposed that in the case of both traditional mixing and mixing using injection mixer essentially the same amount of the reaction products of the chemicals is precipitated on the surface of the flow pipe, it is probable that the precipitation layer formed when using injection mixers can in the same period of time be considerably thicker than in the traditional mixing method. Simultaneously the risk of the precipitations being broken up and released as fragments to the flow increases and the occurrence rate of problems caused by the fragments can even increase. This kind of precipitation problems naturally exist in both wood processing industry as well as many other fields of process industry. In fact, nearly all fields of industry where chemicals introduced or mixed into a pipe flow are allowed to react either mutually or with material entrained with the medium flowing in the pipe or a previously introduced chemical, suffer from precipitation problems of the kind described above that in some way affect the propagation of the process or the quality or production of the intermediate or end products.

Precipitation problems of the described kind occur in, e.g. industrial environments where large amounts of various chemicals, including retention chemicals, adhesives and stabilizing agents etc. are introduced and mixed into process liquids.

In addition to papermaking, in wood processing industry such processes include the production, washing, bleaching and chemical recovery processes of mechanical, chemimechanical and microfiber and nanofiber pulp, in which a large amount of precipitation-forming chemical compounds are formed. These can roughly be divided into inorganic and organic compounds.

Of the inorganic precipitation-causing compounds the following can be mentioned in addition to the calcium carbonate already mentioned. Calcium oxalate, the ion of which is formed in oxygen bleaching of chemical pulp. Barium sulphate is formed when bivalent barium cation is removed from the wood material especially when producing pulp in acid conditions prior to bleaching chemical pulp. Presence of alum, i.e. aluminum sulphate increases precipitation tendencies. Precipitating aluminum hydroxide is sometimes formed immediately after the introduction of alum. Alum itself is commonly used in papermaking, such as in some retention programs, as resin glue, coagulant and so on. When these compounds or said compounds, among others, and compounds and chemicals already present in the fibrous suspension or to be later introduced thereto react, the precipitation of the formed new chemicals is usually prevented by using various chemicals. Other inorganic compounds with precipitation tendencies include, among others, calcium sulphate, calcium silicate, aluminum silicate, aluminum phosphate and magnesium silicates.

Organic precipitations most often relate to various particles fastening to the process pipes or other apparatuses and structures in connection with the process flow by means of a bonding agent. The following can be mentioned among such bonding agents: Pitch, being a wood-based material. Most usually pitches are fatty acids or resin acids, even though some other compounds are also traditionally called pitch. Tacky materials are glue or adhesive matter originating in recycled paper. Slimes are materials formed by microbial activity and that are well adapted to the relatively stable high temperatures and relatively constant pH of paper industry. Fungus can be mentioned as the last bonding material. All of the above-mentioned bonding agents causing precipitations are, in a way, materials that have been introduced into the process from the initial materials of the paper to be produced, i.e. they are not intentionally added to the process. In addition to these, there are the chemicals added to the process for other reasons, such as anti-foaming agents, polysiloxanes, mineral oils, retention polymers and chemicals, nanoparticles, microparticles, pH-adjusting agents, brighteners (OBA, FWA), dispersing agents, starches, colouring agents, pigments, waxes, fillers (for example $TiO_2$, $CaCO_3$, talcum, kaoline), minerals and glues (traditional hydrophobic glues: AKD, ASA, resin and synthetic glues) etc. that tend to form precipitations in advantageous conditions either on their own or especially together with the solids or chemicals present in the process.

SUMMARY OF INVENTION

Thus aim of the invention is to improve the state of the art in introduction and mixing technology by presenting such a novel introduction and mixing method and a reactor by means of which the problems of prior art can be reduced or even totally eliminated.

The aim of the present invention is to develop a reactor that operates in various applications of different fields of industry without the risk of formation of different layers, precipitations or accumulations causing decrease of the quality of the end product, process problems, production interruptions or additional downtime.

An additional aim of the present invention is to develop a reactor that can be connected to the process pipe system the reactor including such an effective chemical mixing system and reactor cleaning system that the commissioning of a tubular in-line reactor will be considered a good investment or that the length of such reactor is reduced to a fraction of the length of prior art reactors.

An additional aim of the invention is to use in an advantageous embodiment the different sensitivity of particles to electric or magnetic fields or electric charges so that such particles are not allowed to fasten to the walls of the flow pipes or reactor.

The method according to an advantageous embodiment of the invention for mixing one or more chemicals into a process liquid flow, in which method the process liquid is allowed to flow in a flow pipe acting as a reactor, is characterized in that at least one chemical is added to the process liquid present in the reactor, said at least one chemical is mixed into the process liquid, said chemical is allowed to react with either another chemical or with a material present in the actual process liquid for forming reaction products while simultaneously preventing either the chemical/s or the reaction products from being fastened to the surfaces of the reactor or apparatuses being in connection with it.

The reactor according to an advantageous embodiment of the invention for mixing one or more chemicals into a process liquid flow, the reactor being positioned as a part of the flow pipe transporting the process liquid is characterized in that the reactor is provided with means for introducing at least one chemical into the flow pipe, means for mixing the at least one chemical into the process liquid and means for keeping the inner surface of the reactor clean.

Other features typical to the method and reactor according to the invention will become apparent from the appended claims and the following description disclosing the most preferred embodiments of the invention.

The following advantages, among others, are achieved by the use of the present invention, when the inventive reactor is dimensioned in length to essentially correspond with the mixing taking place in the pipe flow or the potential precipitation area that has previously caused soiling of the surface of the flow pipe in some ways.
- no precipitations can be formed or fastened to the surface of the flow pipe to deteriorate the end product or affect the production thereof,
- washing the pipes to remove the precipitations can be avoided,
- use of various additional chemicals can be either totally avoided or it can be considerably reduced,
- a full control of conversion by measuring the progress of the reaction,
- short reaction zone—the reactor can be placed even in a short portion of the flow pipe between various process steps,
- control of the reactor and runnability of the process,
- reporting is easy to provide by means of the control system,
- use of tomography allows providing a number of various alarms, thus considerably facilitating quality control,
- faster and more aggressively reacting chemicals can be used because the fast and efficient mixing ensures an even mixing result and the reactor cleaning system ensures that the walls of the reactor remain clean,
- the reactor according to the invention directs towards the use of chemicals with faster reactions, because with chemicals with fast reactions it is possible to use shorter reactors, which makes it easier to install the reactor as a part of the process pipe system, and
- because fast reactions allow a short reactor, the reactor can be coated with or fully manufactured from such a material to which the reaction products do not fasten. Due to the shortness of the reactor its coating or manufacture from a wholly different, possibly much more expensive material than steel, can be economically reasonable.

SUMMARY OF THE DRAWINGS

In the following the inventive method and reactor and the operation thereof are described in more detail with reference to the appended schematic figures, in which.

DETAILED DESCRIPTION OF THE INVENTION

Figure 1:
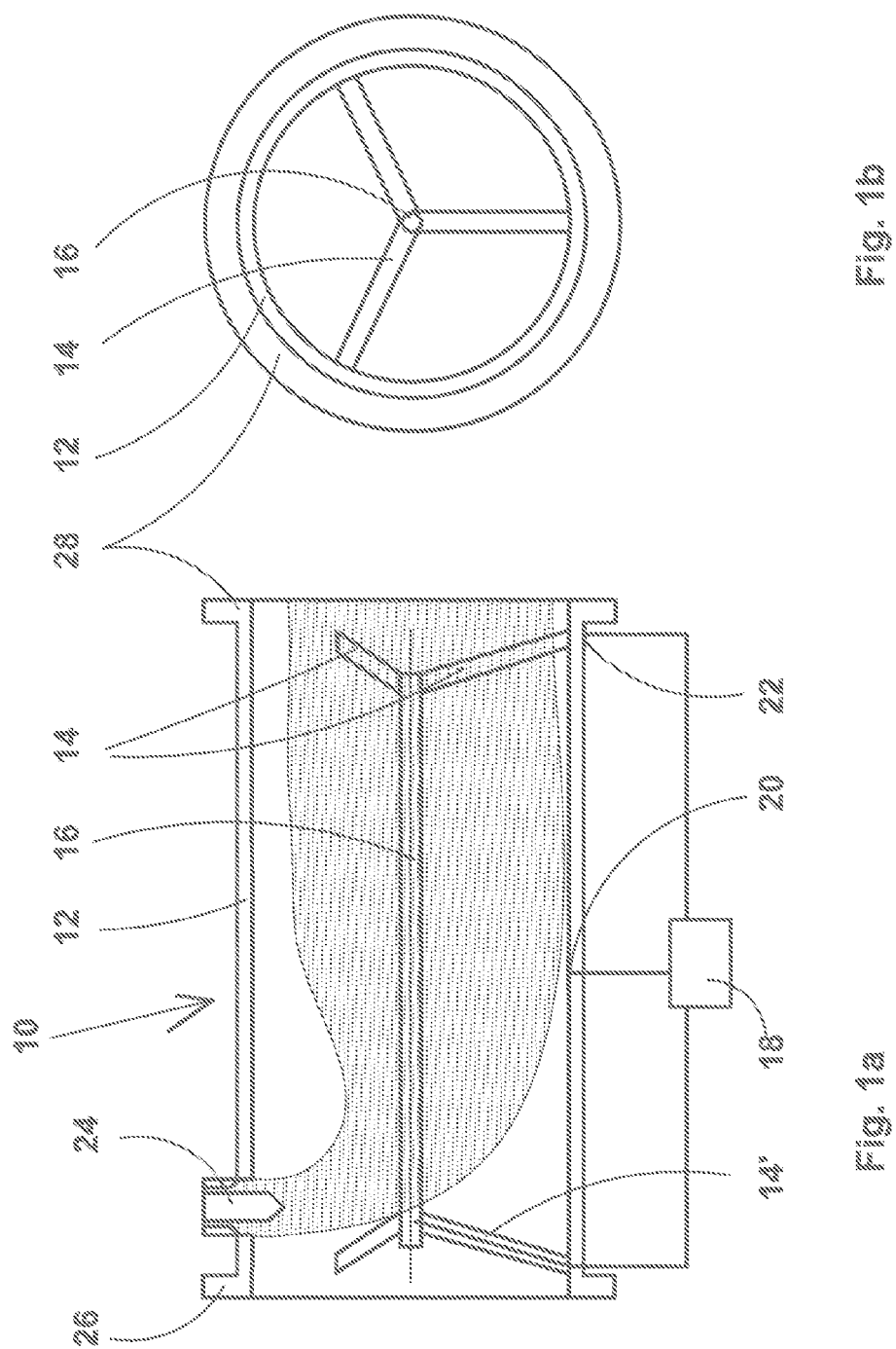
FIGS. 1a and 1b schematically show a reactor according to a preferred embodiment of the invention.

FIGS. 1a and 1b show relatively schematically a reactor 10 according to one preferred embodiment of the invention. The reactor 10 of FIG. 1 comprises a straight cylindrical flow pipe 12, inside which, at a distance from the inner surface of the wall of the reactor, preferably essentially centrally in the flow pipe, is fastened at least one electrically conductive electrode rod 16 by means of arms 14, the rod being in this embodiment electrically connected via one arm 14' to a control system 18 preferably including a voltage source. The electrode rod 16 must be electrically isolated from the flow pipe 12 in case the flow pipe 12 is made of metal, as it in most cases is. This isolation can be carried out by e.g. arranging the fastening arms 14 and 14' of the rod 16 from an electrically non-conductive material or by manufacturing the rod 16 mainly from an electrically non-conductive material and coating the suitable parts thereof with an electrically conductive material. Another electrode 20 is arranged on the inner surface of the flow pipe 12. Said second electrode 20 is electrically connected to the voltage source/control system 18 similar to the first one so that the desired voltage difference can be created between the inner surface of the flow pipe 12 and the electrode rod 16 located in the middle of the pipe. Naturally, the simplest solution is that the flow pipe 12 is made of metal, whereby it can act as an electrode 20 in its entirety and no separate electrode is needed. When the flow pipe 12 is made of electrically non-conductive material, there should preferably be a number of said second electrodes 20, most preferably distributed at even intervals both in the direction of the circumference of the pipe 12 and in the longitudinal direction of the reactor 10. Another alternative is to coat the flow pipe internally with an electrically conductive material, whereby said coating acts as the electrode 20.

The voltage source/control system 18 preferably, but not necessarily, comprises some kind of measurement sensor 22 for monitoring, among others, the effectiveness of the mixing and/or propagation of the reactions in the reactor 10. This sensor can be based on e.g. tomography (here, preferably a tomography measurement based on the electrical conductivity of the fiber suspension) but it can just as well measure the pH value of the pulp or its electric conductivity. The purpose of the measurement sensor is to monitor the effectiveness of the mixing, the progress of the reaction and/or the cleanness of the surface of the reactor so that e.g. the introduction pressure or volume flow can be adjusted, if necessary. When needed, said measurement sensor and a second measurement sensor in addition to said sensor can be arranged in connection with the electrode rod 16, whereby it is possible to monitor e.g. the propagation of the reaction in the middle of the flow in addition to the vicinity of the surface of the reactor. When needed, the measurement sensor can be arranged to be located a distance from the actual electrode rod by means of e.g. an arm made of isolating material, i.e. either in the direction of the axis of the reactor, in the direction of the radius of the reactor or in both directions. It should further be noticed that the propagation of the reaction or the cleanness of the reactor can also be monitored by means of machine vision-based methods or with apparatuses registering the temperature of the process flow or the reactor wall in some way, such as with conventional thermometers, temperature sensors or a heat camera.

The reactor according to the invention additionally comprises an apparatus for feeding chemicals. Its role is naturally very important, because the purpose of the feed apparatus is to both feed and to mix a number of chemicals into the process flow. This is made by injecting the one or more chemical essentially perpendicular to the flow direction of the process liquid (a direction perpendicular to the flow direction of the process liquid +/−30 degrees) and with a high injecting speed (3 to 12 times) in relation to the flow speed of the process liquid. In case the chemical is a fast reacting one, the evenness of the mixing is fully dependent on the operation of the introduction means. Additionally, the greatly varying amounts of the chemicals to be introduced place great requirements to the introduction apparatus. For example, in wood processing industry, when introducing calcium-containing lime milk into the pulp flowing into the headbox of a paper machine for producing calcium carbonate used as a filler, it is often necessary to introduce so much lime milk that the concentration of calcium in the fiber pulp is of the order of >1 g/l. In case the crystallization reaction of the calcium carbonate is made in a smaller liquid volume, such as a partial pulp, the concentration of calcium in the partial pulp is naturally higher, sometimes even many times the above-mentioned value. In this description the term "process liquid" means virgin pulp suspension (long-fiber pulp, short-fiber pulp, mechanical pulp, chemimechanical pulp, chemical pulp), recycled pulp suspension (recycled pulp, reject, fiber fraction from the fiber recovery filter), an additive suspension, a solids-containing filtrate, a filtrate from the fiber recovery filter or a combination thereof. In this embodiment of the invention the wall of the flow pipe is provided with at least one injection mixer 24 mentioned above in the preamble of the description, preferably a TrumpJet® injection mixer developed by Wetend Technologies Oy, by means of which one of the components of calcium carbonate production, carbon dioxide and/or lime milk, can be quickly introduced and evenly mixed into the pulp flowing in the flow pipe 12. A typical feature of a version of the injection mixer 24 is that the introduction and mixing of carbon dioxide and lime milk is made with an introduction liquid so that the chemical is brought into contact essentially simultaneously with the introduction liquid when the mixture thereof is injected into the pulp. When using the injection mixer, the amount of carbon dioxide and lime milk can greatly vary in relation to the amount of introduction liquid, whereby it is possible to use relatively large amounts of introduction liquid, thus ensuring that the amount of chemicals, in some cases a very small amount, penetrates deep into the pulp and is evenly mixed into it. The amounts of carbon dioxide and lime milk introduced are preferably kept stoichiometric, so that essentially the whole amount of chemicals reacts in the reactor and no residue of either chemical remains in the pulp. A typical feature of another version of the injection mixer is that the at least one chemical to be mixed and the introduction liquid are introduced into each other and, if necessary, mixed together already before the actual introduction apparatus.

In the injection mixer 24, a liquid available from the actual process, solids-containing liquid available from the vicinity of the process, a filler fraction or a fiber suspension can be used as introduction liquid. In other words, the liquid to be used can, for example, be in addition to clean water, raw water or a cloudy, clear or super clear filtrate from the process, also a suspension with a very high amount of solids. One alternative worth considering is the use of pulp itself or one of its fiber or filler components as introduction liquid. When using pulp, this can be achieved for example by taking a side flow from the flow pipe 12, in which the flow in this embodiment is pulp, and then introducing it to the injection mixer 24 by means of a pump.

Another essential feature of an embodiment of the injection mixer 24 is that the velocity of the jet of introduction liquid and carbon dioxide or lime milk is essentially higher than that of the pulp flowing in the flow pipe. Thus, the jet of chemical and introduction liquid penetrates deep into the process liquid flow and is effectively mixed therewith. The relation of flow velocities can vary within a range of 2 to 20, preferably within the range of 3 to 12. Preferably, but not necessarily, it is possible to construct the reactor 10 according to the invention so that all conduits, pipelines, pumps and cleaning means are located inside the pipeline within the length defined by flanges 26 and 28, whereby the installation of the reactor 10 to the pipeline can naturally be carried out as easily as possible. An essential structural solution for the operation of an embodiment of the reactor is to position both the electrode rod and the at least one electrode on the circumference of the flow pipe so that their effect extends to both a distance to the upstream side of the reaction zone and the length of the reaction zone. This dimensioning rule also applies when the chemical itself tends to fasten to the wall of the process pipe or to the structures in the process pipe. In this case as well the electrode rod should extend to at least such a distance from the chemical introduction where the chemical has already been used up.

In the reactor, the number of the injection mixers used for introducing the one chemical or chemical compound mainly depends on the diameter of the reactor or the flow pipe. When using standard-size TrumpJet® injection mixers of Wetend Technologies Oy, 1 to 6 pieces are needed depending on the diameter of the flow pipe.

FIG. 1a shows a situation in which carbon dioxide or lime milk is introduced from the injection mixer 24 into the pulp flowing towards the right side inside reactor 10 so that the introduction jet nearly instantaneously penetrates to essentially the whole cross-section of the reactor/flow pipe. Because the introduction takes place by injecting from a nozzle designed for the purpose, the discharged chemical flow is mostly in such small drops or bubbles (when introducing gaseous carbon dioxide) that the mixing of carbon dioxide or lime milk takes place very fast, in practice immediately. At the same time, both the chemicals reacting together as well as the pulp components reacting or otherwise cooperating with the chemical are allowed to contact each other essentially immediately after the injection mixing. In other words, an effectively realized injection mixing ensures that the time needed for the material transfer prior to the reaction is minimal in comparison with traditional mixing methods.

The reactor 10 wall 12 cleaning system according to a preferred embodiment of the invention shown in FIGS. 1a and 1b, dissolving the existing calcium carbonate precipitations and preventing forming of new calcium carbonate precipitations by directing a DC voltage to the electrode rod 16 and the electrode 20 in connection with the wall 12 of the reactor through the voltage supply/control system 18 so that the electrode rod 16 acts as a cathode and the wall 12 of the reactor acts as the anode. When the wall 12 is the anode, the pH value of the liquid adjacent the wall 12 is reduced to clearly acid range, to less than 6, preferably to less than 5, most preferably to a value of 2 to 3, thus preventing carbonate from being fastened to the wall 12. In fact, the carbonate crystals are not even allowed to contact the wall as they dissolve in the liquid phase at a low pH. Naturally, the carbonate has a tendency to precipitate on the surface of the electrode rod acting as cathode when the pH is high near said surface. The disadvantages arising from said precipitation tendency are easy to eliminate by programming the voltage source/control system 18 to change the polarity of the system, whereby the carbonate previously precipitated on the surface acting as the cathode is quickly dissolved in the acid liquid formed near the electrode now acting as the anode. The simplest control method is to program the control system to change polarity at certain intervals (from fractions of a second to minutes or hours) for keeping both electrodes clean. Another way to control the polarity changes is to use a control impulse from the process. It is, for example, possible to monitor the voltage change between the cathode and the anode, whereby a certain increase in voltage in practice means a precipitation layer of a certain depth (the layer acting as isolation). Thus the control system can be calibrated to change the polarity of the system at a certain potential difference. Correspondingly, when said potential difference has been reduced back to its original level or when the potential difference no more changes, the control system returns the polarity back to the original state.

In other words, the cleaning system according to the invention is naturally suitable for use in addition to the application relating to the production of calcium carbonate in paper industry used as an example above, in all applications in process industry where forming of precipitations is dependent on the pH value of the liquid. According to the above example the cleaning system according to the invention can be used for adjusting the pH value of the liquid near the wall of the process pipe or structures installed inside the pipe so that the precipitations can fasten to them.

Figure 2:
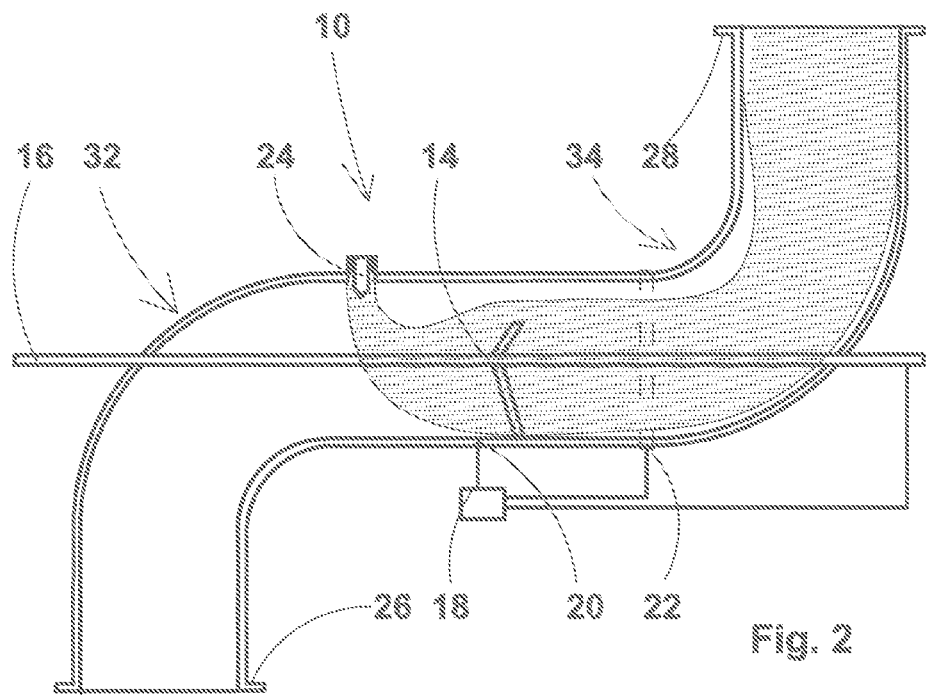
FIG. 2 shows a reactor according to another preferred embodiment of the present invention.

FIG. 2 shows a solution for arranging the reactor according to another preferred embodiment of the invention into the flow pipe. In the solution of the figure the reactor is positioned between two pipe elbows 32 and 34 so that the electrode rod 16 can be supported by its ends to the pipe elbows and to arrange a support by arms 14 only when needed either by one arm arrangement to the middle part of the reactor or by a number of arm arrangements along the electrode rod 16. In this embodiment the support arms 14 of the electrode rod located in the reaction zone of the reactor are preferably either fully made of or at least coated with a material to which the carbonate particles do not fasten to. As the electrode rod 16 extends in the embodiment of the figure to the outside of the pipe elbow 34 of the reactor, the electrode rod can be connected straight to the control unit without the need to direct the conductor via the support arm to the electrode rod inside the reactor. In this case the electrode rod 16 is isolated from the flow pipe, i.e. the reactor 10, whereby the wall of the reactor itself can act as the second electrode. Other parts, instrumentation and operation of the reactor correspond with FIG. 1. Should it be desired to make sure the electrodes on the electrode rod and the surface of the pipe operate as optimally as possible, the portion/portions of the electrode rod located on the area of the pipe elbow can be coated with isolating material. Thus the distance of the electrical surface of the electrode rod from the surface of the pipe is constant along the whole length of the rod and thus also the pH values are even adjacent both electrode surfaces.

Figure 3:
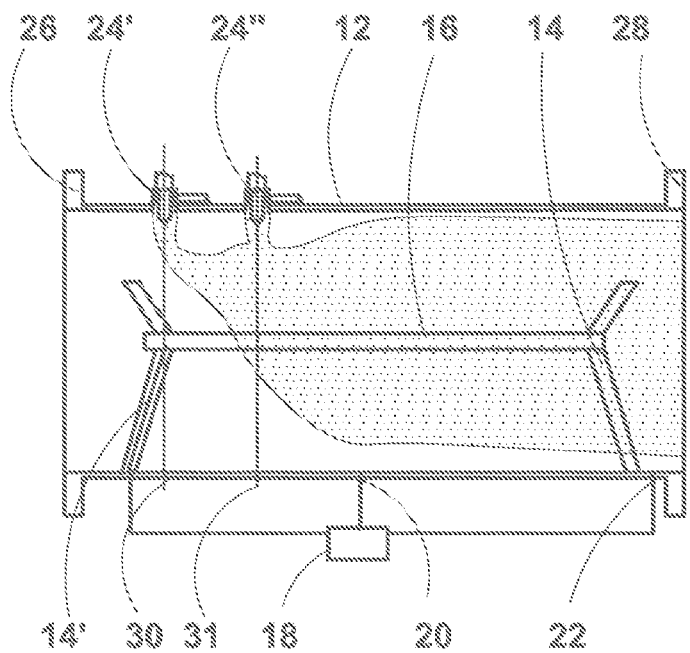
FIG. 3 shows a reactor according to a third preferred embodiment of the present invention.

FIG. 3 shows a reactor according to a third preferred embodiment of the invention. The reactor of FIG. 3 is mainly of the same type as that of FIG. 1, but here the reactor is provided with two injection mixers or mixer stations (a number of mixers mixing the same chemical on essentially the same reactor circumference) 24' and 24" on two successive circumferences of the flow pipe. By means of said mixers 24' and 24" it is possible to ensure the introduction and mixing of carbon dioxide and lime milk already described above to the flowing pulp considerably more efficiently, quickly and evenly than before. In practice the injection mixers 24' and 24" are positioned so that at least one mixer 24' is located on the first circumference 30 of the reactor and at least one mixer 24" is located on the second circumference 31 of the reactor, correspondingly, a distance after the circumference of the mixer 24'. The distance between the mixer circumferences 30 and 31 depends, among others, on the flow velocity of the pulp in the reactor, the introduction velocities of the carbon dioxide and/or lime milk and the introduction liquid, the volume flows of said gases/liquids, the diameter of the reactor, the construction of the injection nozzle, to mention a few parameters. However, preferably the distance between the circumferences 30 and 31 is of the order of 0.05 to 8 meters, more preferably 0.05 to 3 meters, most preferably 0.1 to 2 meters. Preferably the mixers positioned near each other as described above form a mixer pair so that the injection mixer 24 of each mixer pair introducing the second flow is arranged in a location the position of which on the circumference of the process pipe 12 deviates at most 20 degrees, more preferably 10 degrees (measured in the direction of the circumference of the pipe) from the level passing through axis of the process pipe onto which the first mixer 24 is located. Thus, the second injection mixer 24" is in a way located in a sector of 40 degrees, preferably 20 degrees, in the longitudinal direction of the process pipe 12, on the diameter of which sector the first mixer 24' is located.

The reactor according to FIG. 3, i.e. one having two successive injection mixers/injection mixer stations, is used in in-line production of PCC for example so that carbon dioxide is introduced and mixed from the first injection mixer 24' or a series of mixers 24' on the first circumference 30 and lime milk is introduced from the second injection mixer 24" or series of mixers 24" on the second circumference 31. Naturally the introduction of said chemicals can also be arranged in opposite sequence, i.e. first the lime milk ($Ca(OH)_2$) and then the carbon dioxide ($CO_2$). It is also possible to locate said mixer stations in a staggered way onto the same circumference of the flow pipe, whereby the introduction and mixing of chemicals is effected simultaneously. In our tests we have noticed that without any kind of cleaning or anti-fastening systems a considerable layer of PCC fastens very quickly onto the wall of the flow pipe leading to the headbox, i.e. the reactor 10, causing the above-mentioned problems. PCC has a corresponding tendency to fasten to the tip part, the nozzle, of the injection mixer 24", which gradually, in addition to increasing the risk of detaching of large PCC particles, also degrades both the introduction of chemicals from the nozzle and the penetration of the introduction jet and the evenness of the mixing.

When a test reactor according to FIG. 3, producing PCC, was provided with an electric cleaning system also according to FIG. 3, i.e. an electrode rod 16 centrally fastened to the reactor by means of arms 14 and 14', the inner surface of the reactor remained bright for the whole duration of the test runs, in other words the system could fully prevent forming of precipitations on the surface of the flow pipe. FIG. 3 shows a construction solution in which the electrode rod 16 extends essentially to the same diameter (circumference 30) as the first chemical injection mixer 24'. In most cases it would, however, be sufficient that the electrode rod extend from the diameter (circumference 31) of the second chemical injection nozzle 24" to the direction of flow. When planning the cleaning system, it should however be noticed that the precipitations naturally also tend to fasten to the arms 14 and 14' supporting the electrode rod 16. This can be prevented by at least two methods, i.e. either by manufacturing the arms from a material to which the precipitations do not fasten to or by arranging the arms outside the reaction zone, where on the other hand, at the location of the first, upstream arms, there so far is no formation of precipitating material, and on the other hand, at the location of the second, downstream arms, the reaction has progressed to a stage where the material no more is in a precipitating phase.

Thus, for example the precipitation of calcium carbonate used as a filler for papermaking can be carried out by means of an in-line method directly in a process pipe leading to the headbox of the paper machine. In a reactor used for said purpose injection mixers for introducing both carbon dioxide and lime milk are preferably required. It is, naturally, also possible that one of the chemicals is introduced into the pulp already in a previous stage, possibly even by using a mixer of another type. However, here the injection mixing of at least the later introduced chemical makes it possible that the crystallization of PCC, i.e. the precipitated calcium carbonate, takes place at a very short distance in the process pipe. In other words, by reference to FIG. 1a and supposing that the other of the chemicals ($Ca(OH)_2$ and $CO_2$ have already been introduced and mixed into the pulp already before the reactor 10, or by reference to FIG. 3 and supposing that the carbon dioxide and lime milk have first been introduced from the mixer 24' and the carbon dioxide or lime milk then from the mixer 24", the actual crystallization reaction of PCC can in practice commence immediately subsequent to the introduction point of the latter chemical.

Figure 4:
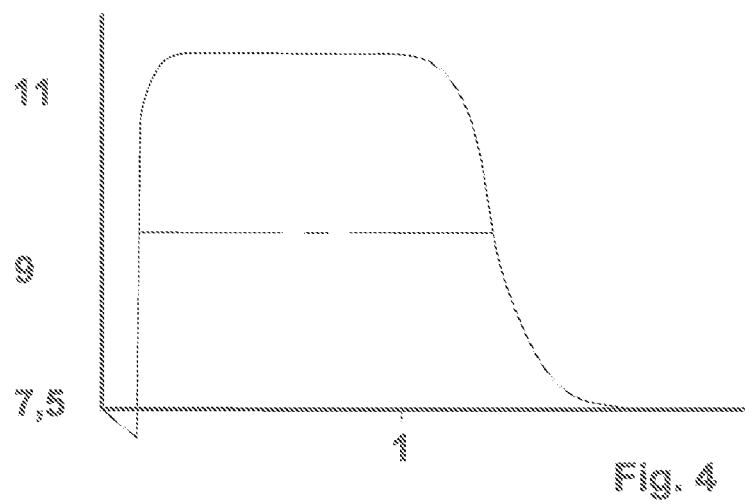
FIG. 4 shows the change of the pH value as a function of time when producing calcium carbonate from carbon dioxide and lime milk with a reactor shown in FIG. 3.

The plot in FIG. 4 shows the change of the pH value of the pulp (vertical axis) as a function of time (horizontal axis, in seconds) when precipitating calcium carbonate into the pulp with the reactor shown in FIG. 3. In the crystallization process schematically shown in the figure the carbon dioxide is first introduced into the pulp (at the origin of the axes) whereby the pH value of the pulp is somewhat reduced from the normal pH of about 7.5, depending on the amount of introduced carbon dioxide and the time between the introduction of carbon dioxide and the introduction of lime milk. Immediately after the start of the introduction and mixing of lime milk the pH value of the pulp starts to increase and in practice it increases to its maximum value, a range of 11 to 12, wherefrom it quickly returns to a range of about 7.5 once the chemicals are used up in the crystallization reaction. In tests the chemicals, introduced in a stoichiometric relation to each other, were depleted in less than two seconds, in about one and a half seconds. The requirement for such a fast crystallization reaction is that the mixing of the chemical/chemicals is essentially complete when using a correctly executed injection mixing (at least for the latter introduced chemical, preferably for both) and the $Ca^{2+}$ and $CO_3^{2-}$ ions formed in the pulp quickly find each other and react forming calcium carbonate crystals.

Due to the very short total duration of the reaction the size distribution of the formed carbonate crystals is very even. According to some estimates it is typical for this kind of production reaction of PCC, as has already been briefly stated above, that immediately subsequent to the crystallization reaction the carbonate crystals are in such a phase, in other words in unstable crystal form prior to changing into calcite, that they tend to fasten to in practice any suitable solids particle or surface located nearby. In pulp, such particles include fibers, various fine solids particles, filler particles and other carbonate crystals. Naturally also the walls of the flow pipe and other objects and structures located in the flow pipe, such as the nozzles of the introduction and mixing means etc. are a good substrate for carbonate crystals to fasten to, whereby there are precipitations formed onto the surface of the flow pipe. In other words, carbonate precipitations are formed on the walls of the flow pipe and other structures only during the stage of an unstable crystal form, whereby the flow pipe can in practice be kept totally clean by preventing the unstable carbonate from precipitating onto the surface of the flow pipe as described above in one of the preferred embodiments of the invention.

The above-mentioned strong change of pH value when introducing carbon dioxide and lime milk as the crystallization reaction progresses and especially as the crystallization reaction ends provides a possibility to follow the progress of the reaction by means of sensors measuring the above-mentioned pH value. If the sensor 22 is located as shown in FIGS. 1a and 3 to the level of the other end of the electrode rod, i.e. to the level of the end of the reactor, the pH value measured by the sensor 22 should be of the same order as before the introduction of the first chemical to avoid further formation of precipitations on the surface of the pipe. Thus, in case the pH value measured by means of a sensor located thus is considerably higher, the introduction/mixing parameters of the chemicals should be changed for improving the mixing efficiency of the chemicals. Naturally, there can be a number of such pH sensors along the length of the reactor (either on the wall of the reactor or on the electrode rod or both), whereby the change of the pH value gives a clear view of the progress of the crystallization reaction.

Referring to the above-mentioned example, a solution worth mentioning is one in which the sensor measuring the pH of the suspension value arriving in the reaction zone of the reactor is located upstream in the reactor, whereby the control system receives up-to-date data about the pH value of the suspension arriving in the reactor. In fact, such a sensor should be located upstream of the chemical introduced first in order to find out the pH value of the fibrous suspension without the effect of the chemicals. When the relation of the carbon dioxide and lime milk introduced into the reactor subsequent to this sensor is kept stoichiometric by introducing the chemicals under control of flow metering, it is possible, if desired, to follow the progress of the crystallization reaction of the carbonate by means of the provided pH sensors. It is possible to correspondingly ensure at the end of the reactor that the crystallization reaction has ended. This is easy to verify by comparing the pH value at the end of the reactor to that measured before the reactor. If the values are similar, the chemicals have reacted in their entirety and there is no more risk of carbonate precipitating onto the surface of the pipe or the structures located therein.

A corresponding monitoring of the operation of the reactor can also be effected by using tomography. Further, a worthwhile method of monitoring the progress of the reaction is measurement based on temperature gradient, in which e.g.

thermometers or temperature sensors located in the process pipe are used for measuring or monitoring the temperature of the process liquid, whereby the phase of the reaction can be found out with the reaction being exothermic or endothermic. Another possible way is to photograph the reaction with a heat camera, whereby the reaction can be discerned from the background as it is endothermic or exothermic.

The forming of crystals, chemical precipitations or the like reaction results or the actual chemicals from precipitations through chemical reactions as described above fasten to the walls of the reactor or to the structures of its process apparatuses also takes place as a result of surface-chemical phenomena in, among others, paper, pulp and cellulose industry as the anionic trash, extracts (pitch), oxalates, calcium and so on entrained in the pulp flow are precipitated in the reactor.

Additionally the reaction chemicals, such as various aluminum derivatives (aluminate, alum) cause similarly difficult precipitations in their own way of operation. Correspondingly, various glues, such as AKD, ASA, resins and synthetic glues, such as SMA cause precipitations in suitable applications.

Figure 5:
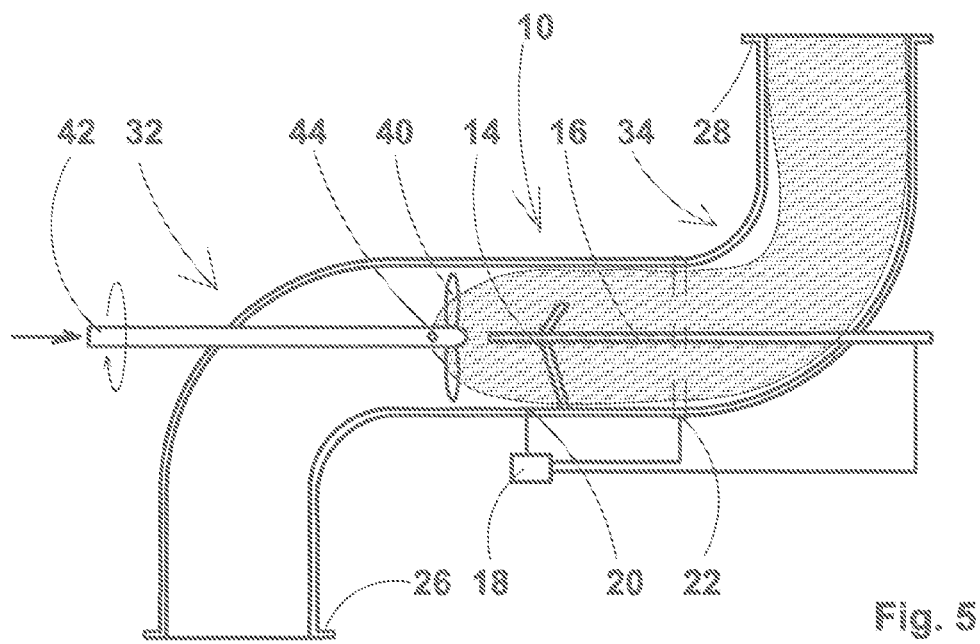
FIG. 5 shows a reactor according to a fourth preferred embodiment of the present invention.

In a fourth preferred embodiment of the invention, shown in FIG. 5, there are actually two separately applicable solutions. Firstly, the figure shows how the reactor according to the invention can also be provided with a mechanical mixer 40, subsequent to which there is relatively immediately the cleaning means with the electrode rod 16 and the arms 14, already shown in previous embodiments. In other words it is possible to introduce the chemical or chemicals to be mixed via the wall of the reactor 10 e.g. by injecting, as already described in earlier embodiments, but now in the vicinity of the mixer 40, whereby the mixer improves the already initiated mixing by injection. Secondly, FIG. 5 shows how the chemical is introduced via the shaft tube 42 of the mixer 40 from holes 44 in the shaft to the process pipe, i.e. reactor 10, whereby the mechanical mixer 40 mixes the chemical further into the flow. It is additionally of course possible to bring the chemicals into the pulp via both the mixer shaft, a separate axial and/or radial introduction pipe (not shown) and from a conduit arranged to the wall of the flow pipe or an injection nozzle (not shown in this context), in other words by one or more of the above-mentioned introduction methods.

As is apparent from the preferred embodiments of the invention described above, the invention relates to an in-line mixing reactor in which one or more chemicals are introduced and mixed into the process liquid and in which these are allowed to react with each other so that fastening of precipitating materials formed in the reactor onto the various surfaces of the reactor, including the surfaces of the mixer, is avoided. The aim of the invention is to dimension the structure of the reactor and its functions so that practically the whole reaction has time to progress along the length of the reactor. Thus, mainly the effective length of the electrode rod is calculated as the length of the reactor. In other words, the electrode rod is extended into such a length in the process pipe along the flow direction of the process liquid that there are no more substances reacting with each other at the downstream end of the electrode rod. For example, in the method and reactor discussed above the length of the reactor should be of the order of 1 to 20 meters, preferably 1 to 6 meters, supposing the flow velocity in the pipe is 3 to 5 m/s. It should also be noticed that in the figures the reactor is not necessarily shown in correct aspect ratio, but in most cases it is shorter in relation to the diameter than in reality.

As is also apparent from the above-mentioned embodiments, an efficient and even mixing leads to fast material transfer and fast reactions, so the adjustment of the mixing can have an effect on the required length of the reactor.

Even though the electrode rod has in the above been described as centrally installed in the flow pipe/reactor, it is in some cases possible to install it also in a slanted position in relation to the axis of the reactor. Such a solution is especially possible when the reactor/flow pipe makes a pipe elbow in which the reaction however progresses. In this case it is possible to arrange centrally extending electrode rods to the straight portions of the flow pipe on both sides of the pipe elbow with a still straight electrode rod between them in the pipe elbow, which is naturally preferably installed so that its effect on the cleaning of the area of the pipe elbow is the best possible. Especially with wide flow pipes it may be necessary to use a number of parallel electrode rods. Thus it is possible to make sure that the pH value of the liquid in the vicinity of the surface to be kept clean is on the desired range.

Figure 6:
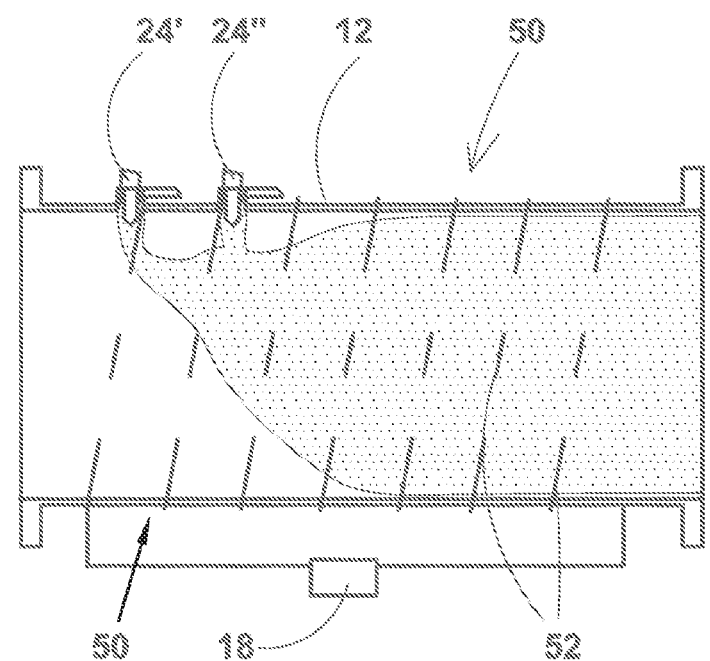
FIG. 6 shows a reactor according to a fifth preferred embodiment of the present invention.

FIG. 6 shows very schematically, as an exemplary fifth preferred embodiment of the present invention, another way of carrying out the crystallization reaction of the calcium carbonate in paper production so that carbonate is not allowed to attach to any surfaces located on the reaction zone. This other method is to arrange a permanent magnet or an electric magnet 50 around the flow pipe 12. Such apparatuses are disclosed in e.g. U.S. Pat. Nos. 5,725,778 and 5,738,766. The permanent magnet forms a magnetic field the direction and strength of which are constant. It is possible to arrange the electric magnet 50 in connection with the flow pipe e.g. by winding electric conductor 52 around the flow pipe 12 and directing an electric current into the coil formed thus. By changing the amplitude, direction and/or frequency of the electric current by means of the control unit 18 the direction and strength of the formed magnetic field can be changed as desired. It is additionally possible to direct electric current into the coil of the electric magnet 50 as waves of different shapes. However, whether the magnetic field is created by means of a permanent magnet or an electric magnet, the operation principle is always the same. An electric field is induced by the magnet inside the flow pipe. In order to be able to use said electric field the suspension flowing in the pipe must contain ions, in this case calcium ions and their counter ions (carbonate ions or hydrogen-carbonate ions). The electric field causes the ions in its range to be directed as required by their own charge in relation to the electric field. The mere existence of the electric field at a limited length in the flow pipe and especially the changes in the direction of the electric field turn the ions entrained with the flow as they tend to be directed according to the changes of the electric field, finally leading to the ionic bonds being released, with the ions being free to react with each other and to form calcium carbonate crystals. In other words, the electric field and especially its changes of direction accelerate the mutual chemical reaction of the ions, because the continuous changes of direction of the ions help their even mixing in the suspension. Additionally, the formed calcium carbonate crystals are immediately in such a phase that they cannot be attached to the surfaces of the flow pipe and form precipitations or, if they form precipitations, they are so soft that they are immediately entrained in the flow with a suitable flow speed.

Yet another method, discussed in e.g. [0033] U.S. Pat. No. 5,591,317 of preventing the formation of precipitations inside the reactor is to use an isolated reactor preferably centrally located inside the reactor, the electrode being electrically connected to the current source/control unit only. Another electrode is e.g. the surface of the reactor either isolated from the liquid or in electric connection with the liquid. In both cases a number of capacitative layers connected in series are formed, through which the electrostatic potential and the intensity of the field are transferred. In other words, in this case as well the electric field induced in the liquid phase causes the desirable changes in the particles normally having tendencies to precipitate.

Yet another kind of preferred way of managing the crystallization reactions of chemicals in a process flow so that no precipitations described above can fasten to any surfaces located in the reaction zone is, as has been mentioned in connection with the support arms of the electrode rod, to either produce such pieces, i.e. both the flow pipe and the structures located inside it in the reaction zone, from such materials that said precipitations do not attach to it or to coat them with such materials. Polyamide can be mentioned as an example of materials usable in a number of applications. Other possible coatings or manufacturing materials include PE resin, various polyurethanes, various fluoride compounds, such as Teflon®, waxes, silicones and epoxy resin. Further, various elastic rubbery compounds can be considered, including synthetic rubber or natural rubber, of which EPDM (ethylene propylene diene monomer) can be mentioned as an example. Additionally, similar results can be achieved with the topology of the surface (mostly by using a so-called nanosurface).

As is also apparent from the above, an efficient and even mixing leads to fast material transfer and fast reactions, so the adjustment of the mixing can have an effect on the required length of the reactor. Even though the electrode rod has in the above been described as being centrally installed in the flow pipe/reactor, it is in some cases possible to install it also in a slanted position in relation to the axis of the reactor. Such a solution is especially possible when the reactor/flow pipe makes a pipe elbow in which the reaction however progresses. In this case it is possible to arrange centrally extending electrode rods to the straight portions of the flow pipe on both sides of the pipe elbow with a still straight electrode rod between them in the pipe elbow, which is naturally preferably installed so that its effect on the cleaning of the area of the pipe elbow is the best possible. Especially with wide flow pipes it may be necessary to use a number of electrode rods. Thus it is possible to make sure that the pH number of the liquid in the vicinity of the surface to be kept clean is on the desired range.

Corresponding solutions can be found in e.g. cellulose and pulp mills in connection with treatment of wood extracts, black liquor and white liquor, in the production of various byproducts of a cellulose mill (bio diesel etc), in the chemical feed of the bleaching plant, in DIP processes of recycled pulp factory and so on.

Finally, it should be noted that only a few of the most preferable embodiments are disclosed above. Thus, it is obvious that the invention is not limited to the above-mentioned embodiments but it can be applied in many ways within the scope defined by the appended claims. It is naturally to be understood that in the above wood processing industry as well as the treatment of pulp discussed in connection with the various embodiments has only been an example. Thus the method and reactor according to the invention can be used in all such processes in which various precipitations tend to collect in the process pipe system. The features disclosed in connection with various embodiments can also be used in connection with other embodiments within the inventive scope and/or different assemblies can be combined from the disclosed features, should it be desired and should it be technically feasible.

We claim:

1. An apparatus for mixing a chemical into a target liquid flowing through an in-line reactor, the apparatus comprising:
   an injection mixer mounted to the in-line reactor and configured to introduce a chemical into the target liquid;
   an electrode rod in the in-line reactor and separated from a wetted wall of the in-line reactor;
   an electrode on or in the wetted wall, and
   a source of electrical energy applied to the electrode rod and the electrode, the electrode rod being configured to apply an electrical field on a wetted surface of the in-line reactor adjacent a region wherein the chemical and target liquid mix and the chemical reacts in the target liquid.

2. The apparatus according to claim 1 wherein the in-line reactor is formed of a process pipe and the injection mixer includes an upstream injection mixer positioned on a circumference of the process pipe and a downstream injection mixer positioned on the circumference of the process pipe downstream from the upstream injection mixer by a distance of 0.05 meters to 8 meters, wherein the downstream injection mixer is on the circumference within 20 degrees of upstream injection mixer.

3. The apparatus according to claim 1 wherein the source of the electrical energy includes a voltage source and an actual control system.

4. A method of mixing a chemical in a target liquid, wherein the chemical is mixed with the target liquid in a reactor being formed in a flow pipe transporting the target liquid; the reactor including an injection mixer configured to introduce the chemical into the target liquid, a first electrode arranged and extending in the flow pipe along a direction of the flow of the target liquid and a second electrode on or incorporated in a wetted surface exposed to the target liquid and of the reactor, the second electrode extending the length of the reactor, wherein the first electrode and the second electrode are isolated from each other and each exposed to the target liquid in the flow pipe, the method comprising:
   injecting a chemical through at least one injection mixer to said target liquid at a velocity greater than a flow velocity of the target liquid proximate to where the chemical is injected and as said target liquid flows through the reactor;
   allowing said chemical to react while in the target liquid, and
   inhibiting precipitation of the chemical or a reaction product of the chemical on the surface of or in the reactor by application of an electric field to or proximate to the surface along a region of the surface adjacent to the reaction involving the chemical by:
   applying a direct current (DC) to the first electrode and the second electrode, wherein the polarity of the DC causes one of the first electrode and the second electrode to be a cathode and the other of the first electrode and the second electrode to be an anode, and
   periodically switching the polarity of the DC such that one of the first electrode and the second electrode becomes the anode while switching the other of the first electrode and the second electrode to become the cathode.

5. The method according to claim 4 wherein the injection of the chemical is substantially perpendicular to a flow direction of the target liquid through the flow pipe.

6. The method according to claim 4 wherein the electric current is applied to the at least one of the first electrode and the second electrode to affect the pH value of a layer of the target liquid proximate to the electrodes sufficiently to achieve the suppression.

7. The method according to claim 4 further comprising monitoring the reaction involving the chemical based by obtaining data from a sensor positioned to sense the reaction, wherein the sensor is at least one of a pH sensor, a conductivity sensor, a tomography imaging device, a machine vision device, a thermometer and a heat camera.

8. The method according to claim 4 wherein the target liquid is a liquid for wood processing.

9. The method according to claim 8 wherein the liquid for wood processing includes at least one of a liquid including cellulose, black liquor, white liquor, a liquid byproduct of a cellulose mill, a liquid byproduct of a bleaching plant and a liquid byproduct of a recycled pulp mill.

10. The method according to claim 4 wherein the chemical is at least one of lime milk, carbon dioxide, an aluminum derivative, a glue, a mineral, a resin and a synthetic glue.

11. A method to mix a chemical in a target liquid comprising:

flowing the target liquid through a flow pipe;

injecting the chemical into the flowing target liquid by passing the chemical through an injection mixer attached to the flow pipe;

allowing the chemical to react in the flowing target liquid in a reactor portion of the flow pipe, wherein the reactor portion is adjacent and downstream of the injection mixer;

applying a direct current to a first electrode and a second electrode, wherein the first electrode is within the flow pipe, positioned in the flow of the target liquid, and extends along the reactor portion of the flow pipe, and the second electrode is on or incorporated in a wetted surface of the reactor portion and isolated from the first electrode;

inhibiting precipitation of the chemical or a reaction product of the chemical on the wetted surface of the reactor portion by the application of the direct current, and periodically reversing the direct current to cause the first electrode to switch between a cathode and an anode and the second electrode to switch between an anode and a cathode.

* * * * *